United States Patent [19]

Kyrtsos

[11] Patent Number: 5,430,657
[45] Date of Patent: Jul. 4, 1995

[54] METHOD AND APPARATUS FOR PREDICTING THE POSITION OF A SATELLITE IN A SATELLITE BASED NAVIGATION SYSTEM

[75] Inventor: Christos T. Kyrtsos, Peoria, Ill.

[73] Assignee: Caterpillar Inc., Peoria, Ill.

[21] Appl. No.: 963,677

[22] Filed: Oct. 20, 1992

[51] Int. Cl.⁶ .................. G01S 5/06; G01S 5/10
[52] U.S. Cl. .................. 364/459; 364/449; 342/357; 342/457
[58] Field of Search .............. 364/459, 449, 458; 342/357, 450, 451, 463, 457, 358

[56] References Cited

U.S. PATENT DOCUMENTS

| | | | |
|---|---|---|---|
| 4,578,678 | 3/1986 | Hurd | 343/357 |
| 4,646,096 | 2/1987 | Brown | 342/357 |
| 4,894,662 | 1/1990 | Counselman | 342/357 |
| 4,903,212 | 2/1990 | Yokouchi et al. | 364/449 |
| 4,912,475 | 3/1990 | Counselman, III | 342/352 |
| 5,119,102 | 6/1992 | Barnard | 342/357 |
| 5,148,179 | 9/1992 | Allison | 342/357 |
| 5,155,490 | 10/1992 | Spradley, Jr. et al. | 342/357 |
| 5,220,509 | 6/1993 | Takemura et al. | 364/449 |
| 5,222,245 | 6/1993 | Ando et al. | 455/13.2 |
| 5,225,842 | 7/1993 | Brown et al. | 342/357 |
| 5,272,483 | 12/1993 | Kato | 342/357 |
| 5,274,382 | 12/1993 | Wills et al. | 342/359 |
| 5,293,318 | 3/1994 | Fukushima | 364/449 |
| 5,323,322 | 6/1994 | Mueller et al. | 364/449 |

OTHER PUBLICATIONS

Schuchman et al.; Applicability of an Augmented GPS for Navigation in the National Airspace System; IEEE 77 (1989) Nov., No. 11; pp. 1709–1727.

Collins, "GPS Equipment Survey-GPS What Does It All Mean", *P.O.B.*, Jun.–Jul., 1987, pp. 12–21.

Raol et al., "On The Orbit Determination Problem", *IEEE Transactions On Aerospace And Electronic Systems*, vol. AES-21, No. 3, May, 1985, pp. 274–290.

Primary Examiner—Michael Zanelli
Attorney, Agent, or Firm—James R. Yee

[57] ABSTRACT

The position of a satellite in a satellite based navigation system is determined without reliance on satellite ephemeris data. Orbital parameters are computed for each satellite. The orbital parameters can then be used to predict the position of each satellite at any time. Subsequent ephemeris data may be compared to a predicted satellite position to determine whether the ephemeris data is corrupt. The orbital parameters may be determined by: computing a pseudorange and a velocity for a selected satellite for a plurality of times, computing at least three estimated positions of the satellite from the pseudoranges and velocities, and computing orbital parameters for the satellite from the three estimated positions. In another embodiment, the orbital parameters are determined by: determining the position of a receiver for at least three times using a constellation of satellites, using the three receiver positions to triangulate on an average position for the selected satellite in the constellation, repeating these steps until at least three mean satellite positions have been computed, computing the orbital parameters from the three mean positions of the selected satellite.

19 Claims, 10 Drawing Sheets

METHOD AND APPARATUS FOR PREDICTING THE POSITION OF A SATELLITE IN A SATELLITE BASED NAVIGATION SYSTEM

FIELD OF THE INVENTION

This invention relates generally to the field of navigation systems which use a constellation of Earth-orbiting satellites to determine the position of a receiver at or near the Earth's surface. More specifically, the invention relates to a method and apparatus for predicting the position of each satellite in the constellation.

BACKGROUND OF THE INVENTION

Several national governments, including the United States (U.S.) of America, are presently developing a terrestrial position determination system, referred to generically as a global positioning system (GPS). A GPS is a satellite-based radio-navigation system which is intended to provide highly accurate three-dimensional position information to receivers at or near the surface of the Earth.

The U.S. government has designated its GPS the "NAVSTAR." The NAVSTAR GPS is expected to be declared fully operational by the U.S. government in 1993. The government of the former Union of Soviet Socialist Republics (U.S.S.R.) is engaged in the development of a GPS known as "GLONASS". Further, two European systems known as "NAVSAT" and "GRANAS" are also under development. For ease of discussion, the following disclosure focuses specifically on the NAVSTAR GPS. The invention, however, has equal applicability to other global positioning systems.

In the NAVSTAR GPS, it is envisioned that four orbiting GPS satellites will exist in each of six separate circular orbits to yield a total of twenty-four GPS satellites. Of these, twenty-one will be operational and three will serve as spares. The satellite orbits will be neither polar nor equatorial but will lie in mutually orthogonal inclined planes.

Each GPS satellite will orbit the Earth approximately once every 12 hours. This coupled with the fact that the Earth rotates on its axis once every twenty-four hours causes each satellite to complete exactly two orbits while the Earth turns one revolution.

The position of each satellite at any given time will be precisely known and will be continuously transmitted to the Earth. This position information, which indicates the position of the satellite in space with respect to time (GPS time), is known as ephemeris data.

In addition to the ephemeris dam, the navigation signal transmitted by each satellite includes a precise time at which the signal was transmitted. The distance or range from a receiver to each satellite may be determined from this time of transmission which is included in each navigation signal. By noting the time at which the signal was received at the receiver, a propagation time delay can be calculated. This time delay when multiplied by the speed of propagation of the signal will yield a "pseudorange" from the transmitting satellite to the receiver.

The range is called a "pseudorange" because the receiver clock may not be precisely synchronized to GPS time and because propagation through the atmosphere introduces delays into the navigation signal propagation times. These result, respectively, in a clock bias (error) and an atmospheric bias (error). Clock biases may be as large as several milliseconds.

Using these two pieces of information (the ephemeris data and the pseudorange) from at least three satellites, the position of a receiver with respect to the center of the Earth can be determined using passive triangulation techniques.

Triangulation involves three steps. First, the position of at least three satellites in "view" of the receiver must be determined. Second, the distance from the receiver to each satellite must be determined. Finally, the information from the first two steps is used to geometrically determine the position of the receiver with respect to the center of the Earth.

Triangulation, using at least three of the orbiting GPS satellites, allows the absolute terrestrial position (longitude, latitude, and altitude with respect to the Earth's center) of any Earth receiver to be computed via simple geometric theory. The accuracy of the position estimate depends in part on the number of orbiting GPS satellites that are sampled. Using more GPS satellites in the computation can increase the accuracy of the terrestrial position estimate.

Conventionally, four GPS satellites are sampled to determine each terrestrial position estimate. Three of the satellites are used for triangulation, and a fourth is added to correct for the clock bias described above. If the receiver's clock were precisely synchronized with that of the GPS satellites, then this fourth satellite would not be necessary. However, precise (e.g., atomic) clocks are expensive and are, therefore, not suitable for all applications.

For a more detailed discussion on the NAVSTAR GPS, see Parkinson, Bradford W. and Gilbert, Stephen W., "NAVSTAR: Global Positioning System—Ten Years Later," *Proceedings of the IEEE,* Vol. 71, No. 10, October 1983; and *GPS: A Guide to the Next Utility,* published by Trimble Navigation Ltd., Sunnyvale, California, 1989, pp. 1–47, both of which are incorporated herein by reference. For a detailed discussion of a vehicle positioning/navigation system which uses the NAVSTAR GPS, see commonly owned U.S. patent application Ser. No. 07/628,560, entitled "Vehicle Position Determination System and Method," filed Dec. 3, 1990, which is incorporated herein by reference.

In the NAVSTAR GPS, the electromagnetic signals from each satellite are continuously transmitted using a single carrier frequency. Each satellite, however, uses a different modulation gold code to allow differentiation of the signals. The carrier frequency is modulated using a pseudorandom signal which is unique to each GPS satellite. Consequently, the orbiting GPS satellites can be identified when the navigation signals are demodulated. Furthermore, the NAVSTAR GPS envisions two modes of modulation for the carrier wave using pseudorandom signals. In the first mode, the carrier is modulated by a "C/A signal" and is referred to as the "Coarse/Acquisition mode". The Coarse/Acquisition or C/A mode is also known as the "Standard Positioning Service". The C/A signal is a gold code sequence having a chip rate of 1.023 MHz. Gold code sequences are known in the art.

A chip is one individual pulse of the pseudorandom code. The chip rate of a pseudorandom code sequence is the rate at which the chips in the sequence are generated. Consequently, the chip rate is equal to the code repetition rate divided by the number of members in the code. With respect to the C/A mode of the NAVSTAR GPS, there exists 1,023 chips in each gold code sequence and the sequence is repeated once every millisecond. Use of the 1.023 MHz gold code sequence from four orbiting GPS satellites enables the terrestrial position of an Earth receiver to be determined to an approximate accuracy of within 60 to 100 meters (with 95% confidence).

The second mode of modulation in the NAVSTAR GPS is commonly referred to as the "precise" or "protected" (P) mode. In the P-mode, the pseudorandom code has a chip rate of 10.23 MHz. Moreover, the P-mode sequences are extremely long, so that the sequences repeat no more than once every 267 days. As a result, the terrestrial position of any Earth receiver can be determined to within an approximate accuracy of 16 meters (spherical error probable). The P-mode is also known as the "Precise Positioning Service ".

The P-mode sequences are held in secrecy by the United States government and are not made publicly available. The P-mode is intended for use only by Earth receivers specifically authorized by the United States government.

Thus, given that the P-mode modulated data is generally not available, many GPS users must rely solely on the GPS data provided via the C/A mode of modulation. The U.S. government (the operator of the NAVSTAR GPS) may at certain times introduce errors into the C/A mode GPS data being transmitted from the GPS satellites by changing clock and/or ephemeris parameters. That is, the U.S. government can selectively corrupt the GPS dam. This is known as "selective availability" or simply SA. SA may be activated for a variety of reasons, such as national security.

When SA is activated, the U.S. government is still able to use the NAVSTAR GPS because the U.S. government has access to the P-mode modulation codes. The C/A mode dam, however, may be rendered substantially less accurate. When this occurs, it is important for a navigation system which relies on the C/A mode of GPS to be capable of recognizing the corrupt data.

Further, the U.S. government may use varying degrees of selective availability. The ephemeris and/or the clock parameters for one or more satellites may be slightly or substantially modified.

In addition to selective availability, any one of the GPS satellites may malfunction and transmit erroneous data. Other errors may be induced into the GPS signals from atmospheric effects, receiver noise, reflections, shading, satellite path shifting, etcetera. The incorrect data resulting therefrom may result in computation of incorrect pseudoranges and incorrect satellite positions by a receiver.

In such circumstances, it is desirable to recognize the bad satellite data and, if possible, compensate for it to prevent erroneous position estimates.

GPS receiver systems may be either open-ended or differential (as discussed below). A differential GPS system will substantially reduce the effects of many of the errors discussed above. However, to reduce the effects of these errors further and for non-differential GPS systems, it is desirable to recognize the bad satellite data and, if possible, compensate for it to prevent erroneous position estimates.

SUMMARY OF THE INVENTION

The invention is an apparatus and method for use with a satellite based navigation system. The invention allows the position of a satellite to be determined without reliance on the satellite ephemeris data. Alternatively, the invention may be used to continuously monitor the integrity of the ephemeris data received from a satellite.

Orbital parameters are computed for each satellite. The orbital parameters can then be used to predict the position of each satellite at any time. In a first embodiment, the orbital parameters may be determined by: computing a pseudorange and a velocity for a selected satellite for a plurality of times, using the pseudoranges and velocities to compute at least three estimated positions of the satellite, and using the three estimated positions to compute orbital parameters for the satellite.

In another embodiment, the orbital parameters are determined by: using a constellation of satellites to determine the position of a receiver for at least three times, using the three receiver positions to triangulate on an average position for the selected satellite in the constellation, repeating these steps until at least three mean satellite positions have been computed, computing the orbital parameters from the three mean positions of the selected satellite.

DESCRIPTION OF THE PREFERRED EMBODIMENT

The present invention is now described with reference to the figures where like reference numbers denote like elements/steps.

Figure 1:
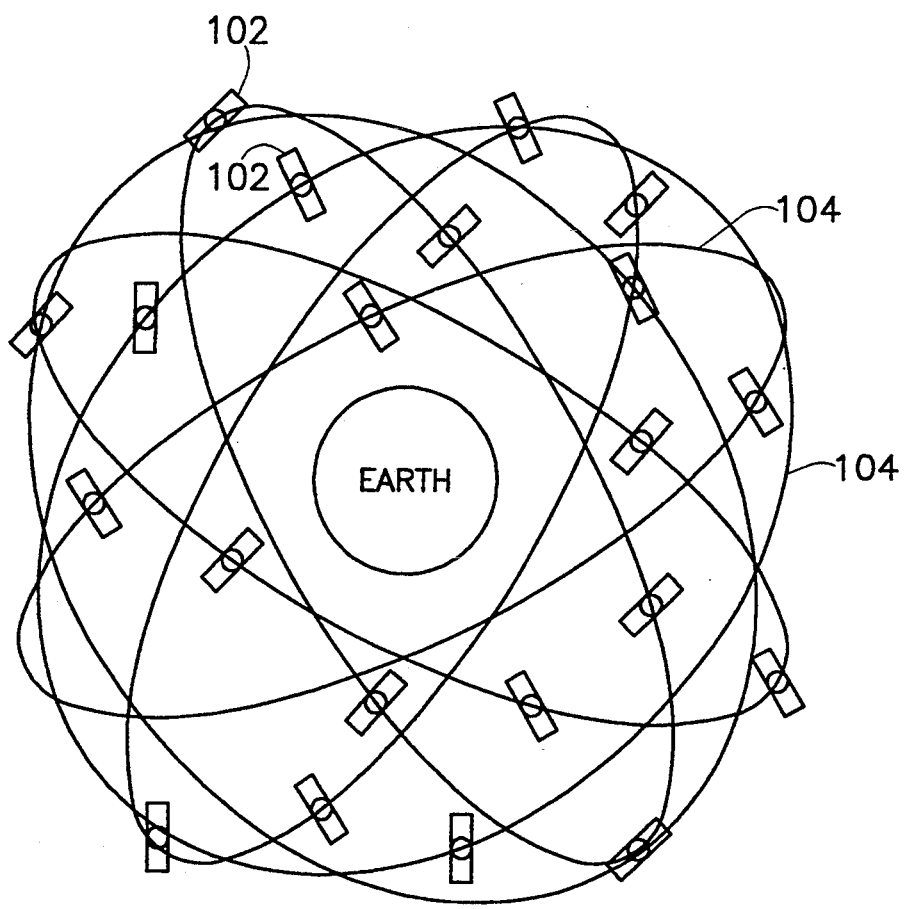
FIG. 1 is a diagram depicting the NAVSTAR GPS satellites in their respective orbits around the Earth.

The invention is a method and apparatus for monitoring the integrity of position data received from a satellite based navigation system. In the preferred embodiment, the NAVSTAR Global Positioning System (GPS) is used. As discussed above and illustrated in FIG. 1, the NAVSTAR GPS includes twenty-one operational satellites 102 which orbit the Earth in six orbits 104.

Figure 2:
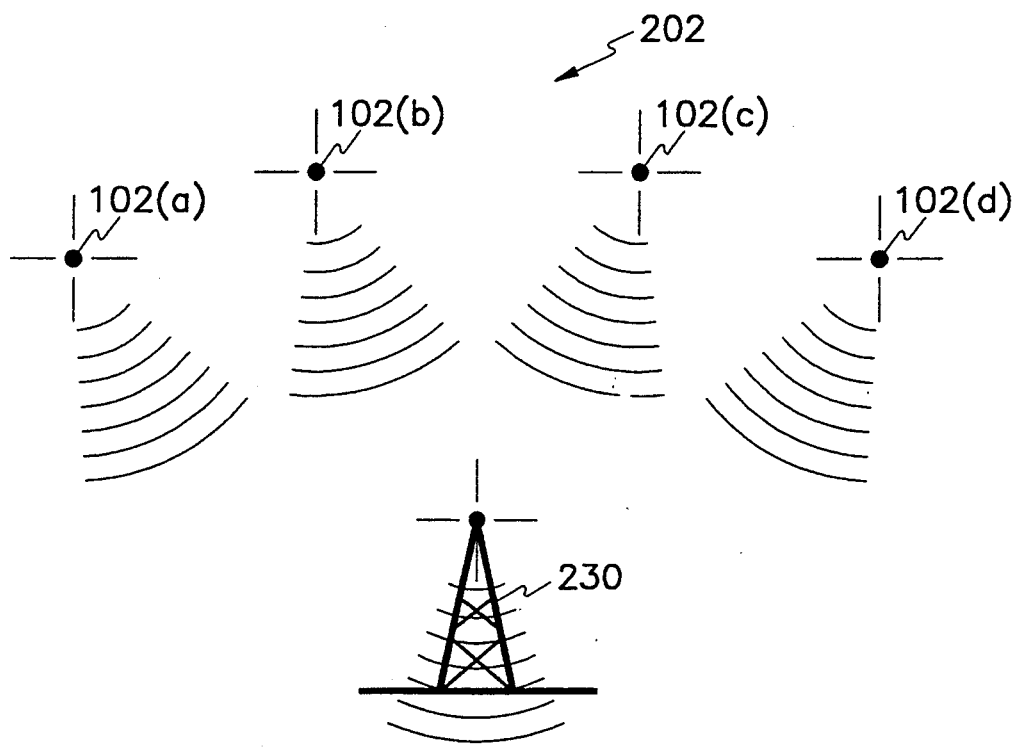
FIG. 2 is a diagram illustrating an autonomous vehicle system which includes a constellation of four GPS satellites, a pseudolite, a base station, and an autonomous vehicle.
Figure 2:
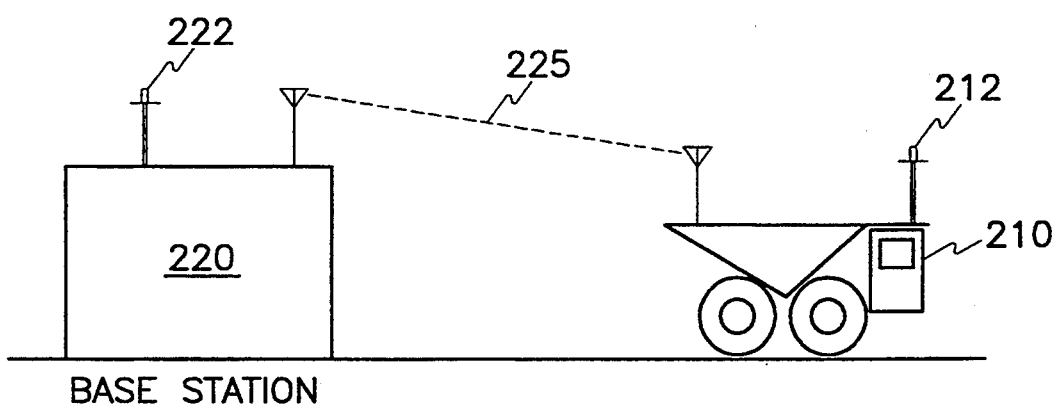

The invention is described in the environment of an autonomous vehicle system 200 as shown in FIG. 2. A representative GPS constellation 202 includes four GPS satellites 102(a)–102(d) for transmitting GPS data. A vehicle (e.g., an autonomous mining truck) 210 and a base station 220 are adapted to receive the GPS data/navigation signals from each GPS satellite 102 in the constellation using respective GPS antennas 212 and 222.

A GPS receiver can receive GPS navigation signals from a satellite which is "in view" of the receiver (i.e., line of sight communications). For example, "in view" may be defined as any satellite that is at least ten degrees up from the horizon. The ten degree angle provides a buffer zone between a useful, in view satellite and a satellite which is just passing out of view below the horizon.

A "constellation" is a group of satellites selected from the satellites "in view" of a GPS receiver. For example, four satellites may be selected from a group of six which are in view of a GPS receiver. The four satellites are normally selected because of a favorable geometry for triangulation (discussed below).

Base station 220 includes a GPS receiver which is located at a known, fixed position. Base station 220 communicates with vehicle 210 over communications channel 225.

Communication channel 225 represents the communications link between base station 220 and vehicle 210. In the preferred embodiment, communication channel 225 comprises radio transceivers. Communication channel 225 is used to transfer data between base station 220 and vehicle 210.

System 200 may optionally include one or more pseudolites 230. A "pseudolite" is a transmitting system located on or near the Earth's surface which emulates a GPS satellite. Because a pseudolite has a fixed, known position, it can greatly enhance the position estimates derived from GPS. For ease of discussion herein, only GPS satellites 102 will be referenced. It should be understood, however, that where position data from a satellite is required, pseudolite data may be substituted.

Figure 3:
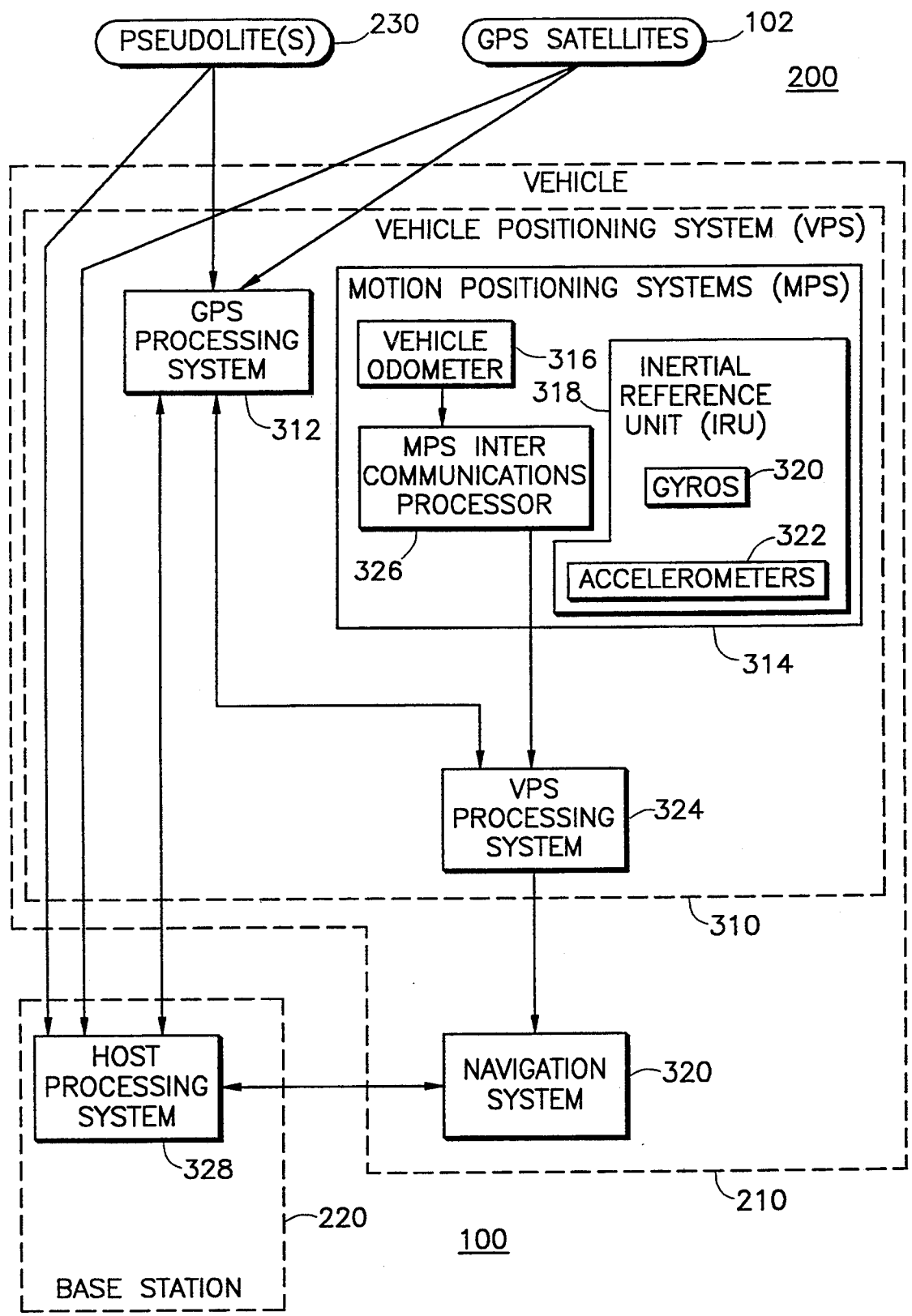
FIG. 3 is a block diagram of the autonomous vehicle system detailing the vehicle positioning system of the autonomous vehicle.

FIG. 3 shows a high-level block diagram of system 200 of the invention, including GPS satellites 102, vehicle 210, base station 220, and pseudolites 230. Vehicle 210 includes a vehicle positioning system (VPS) 310 and a navigation system 320.

VEHICLE POSITIONING SYSTEM (VPS) 310

The task of guiding vehicle 210 along a prescribed path requires, among other things, an accurate estimate of the vehicle's current position relative to some reference point. Once the current position is known, vehicle 310 can be commanded to proceed to its next destination. VPS 310 allows position estimates of vehicle 210 to be determined with extreme precision.

VPS 310 includes a GPS processing system 312 and a motion positioning system (MPS) 314. GPS processing system 312 receives GPS data, i.e., navigation signals, from GPS satellites 102 and computes a first position estimate (FPE) for vehicle 210 therefrom. MPS 314 includes a vehicle odometer 316 and an inertial reference unit (IRU) 318 which track the position of the vehicle based on changes from an initial known position. MPS 314 produces (the actual computations are done in VPS processing system 324) a second position estimate for vehicle 210. The first position estimate and the second position estimate are independently derived.

The first position estimate (from GPS) may be used as an independent indication of the position of vehicle 210. Similarly, the second position estimate (from MPS) may be used as an independent indication of the position of vehicle 210. In the preferred embodiment, however, the first and second position estimates are combined by a VPS processing system 324 (as discussed below) to produce a more accurate third or best position estimate.

NAVIGATION SYSTEM 320

Navigation system 320 receives the third position estimate from VPS 314. Navigation system 320 uses this precise, third position estimate to accurately navigate vehicle 210.

GPS PROCESSING SYSTEM 312

Figure 4:
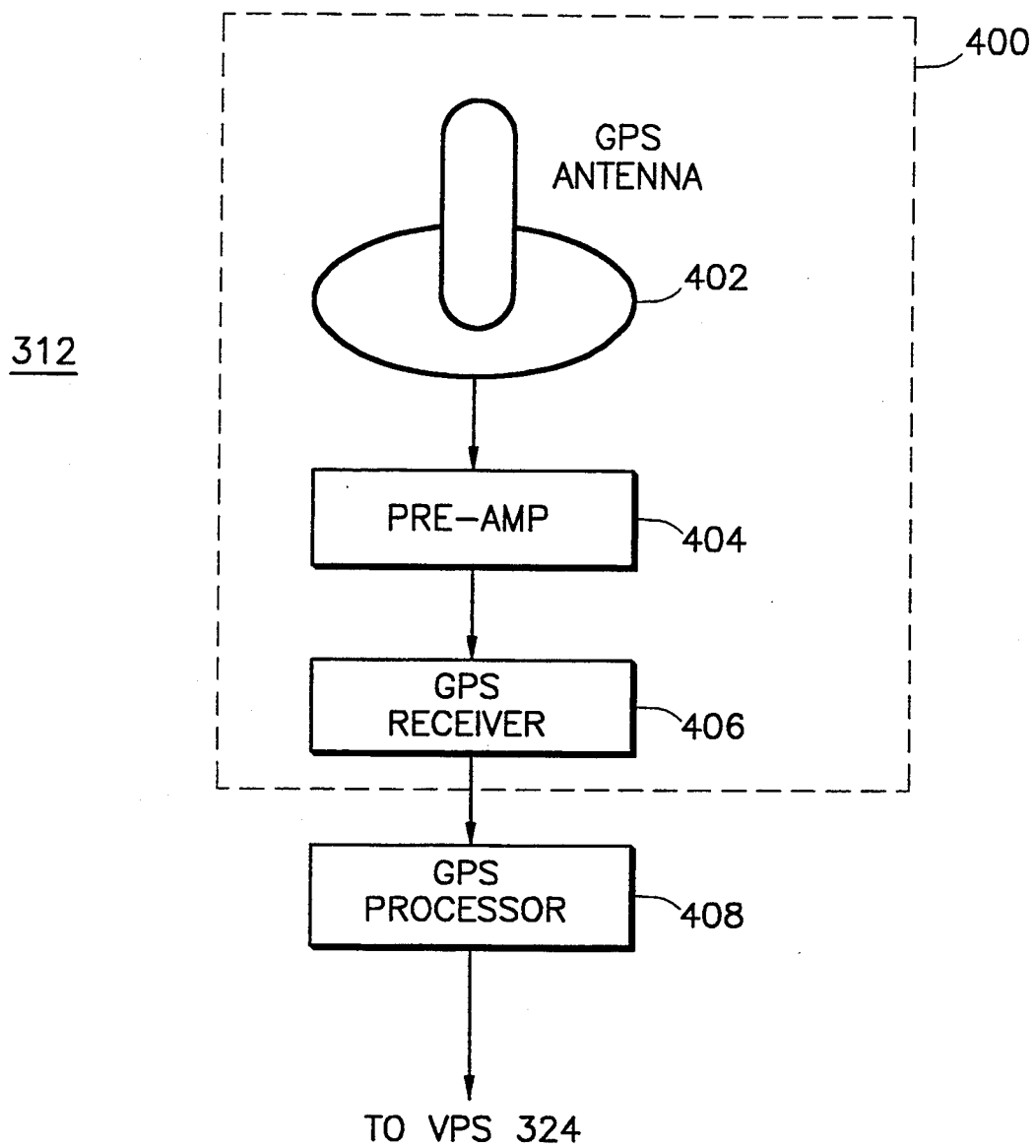
FIG. 4 is a block diagram of a GPS processing system.

GPS processing system 312 is the heart of system 200. With reference to FIG. 4, GPS processing system 312 includes a receiver system 400 and a GPS processor 408. Receiver system 400 receives and decodes the navigation signals from the satellites. GPS processor 408 then uses the information from receiver system 400 to compute the first position estimate.

Receiver system 400 includes a GPS antenna 402, a preamplifier 404, and a GPS receiver 406. Antenna 402 is adapted to receive electromagnetic radiation in the radio portion of the spectrum. Preamplifier 404 amplifies a GPS navigation signal received by GPS antenna 402 from a selected GPS satellite. GPS receiver 406 is a multi-channel receiver which decodes the GPS navigation signals and produces a pseudorange and a satellite position for each selected satellite. GPS processor 408 uses the pseudoranges and satellite positions for a plurality of satellites to calculate the first position estimate for vehicle 210.

In the preferred embodiment, antenna 402 and preamplifier 404 are integrated into a single unit. The combined antenna/preamplifier 402/404 and receiver 406 are available together under part number MX4200 from Magnavox Advanced Products and Systems Co., Torrence, California. GPS processor 408 includes an MC68020 microprocessor, available from Motorola, Inc., of Schaumburg, Illinois.

Receiver 406 computes a pseudorange for each satellite as follows. As described above, each signal transmitted by a GPS satellite is continuously encoded with the exact time at which the signal was transmitted. By noting the time at which the signal was received at receiver 406, a propagation time delay can be computed. This time delay when multiplied by the speed of propagation of the signal ($2.9979245998 \times 10^8$ m/s) will yield the pseudorange from the transmitting satellite to the receiver. As discussed above, the range is called a "pseudorange" because the receiver clock is not precisely synchronized to GPS time (causing a clock error) and because propagation through the different layers of the atmosphere changes the speed of the propagating signals (causing an atmospheric error).

GPS receiver 406 may use an almanac to roughly determine the position of a satellite (e.g., for acquisition purposes). For a more precise determination of satellite position, the receiver decodes the GPS navigation signal and extracts ephemeris data therefrom. The ephemeris data indicates the precise position of the transmitting satellite.

GPS processor 408 calculates the first position estimate using the pseudoranges and satellite positions from GPS receiver 406. This is described below with reference to FIG. 5.

Figure 5:
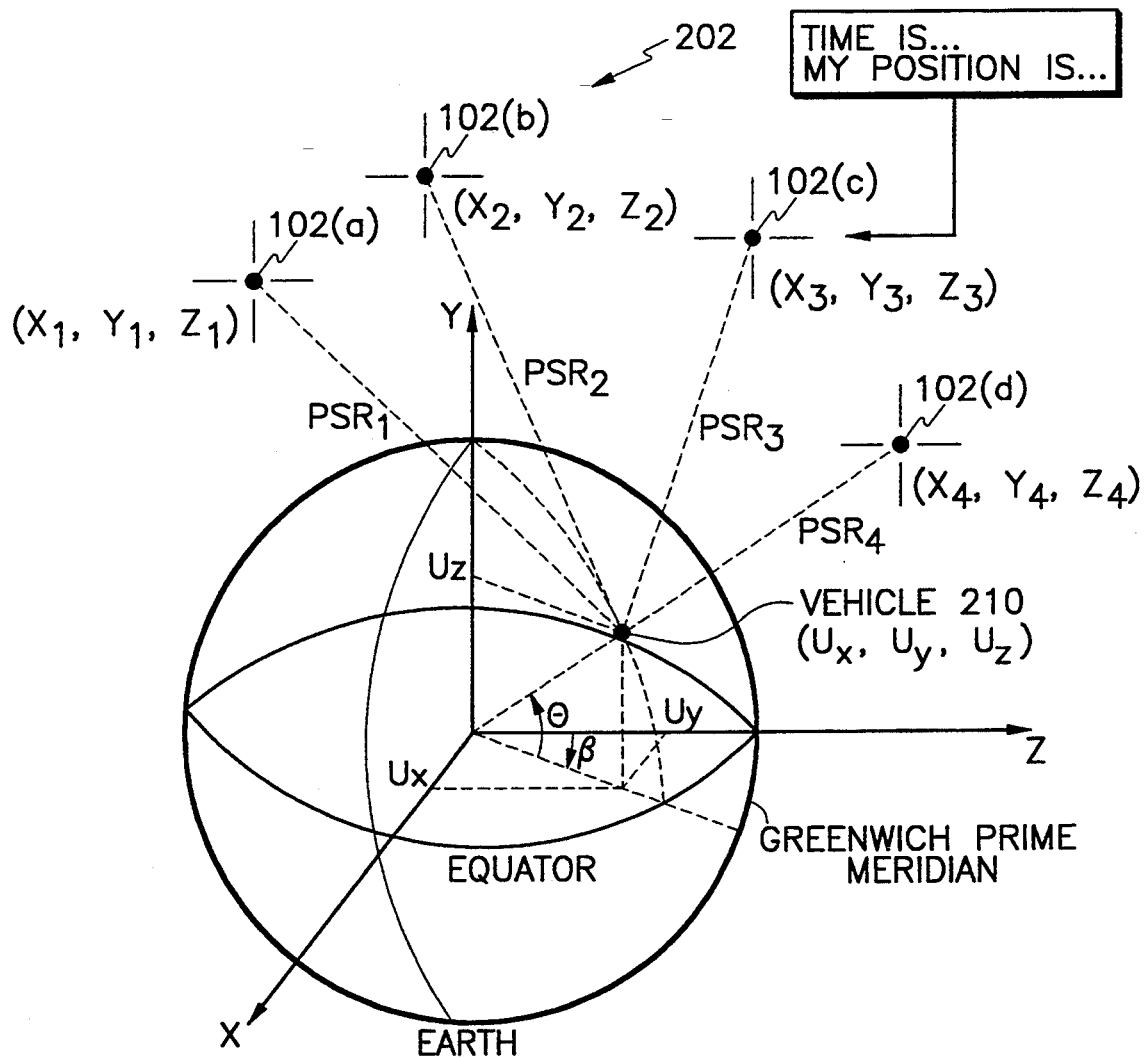
FIG. 5 is a diagram showing the geometric relationship between the center of the Earth, a vehicle near the surface of the Earth and a constellation of GPS satellites.

FIG. 5 shows a sample satellite constellation 202, having GPS satellites 102(a)–102(d), in view of vehicle 210. In Cartesian coordinates, with respect to the center of the Earth, satellite 102(a) is located at $(x_1, y_1, z_1)$; satellite 102(b) is located at $(x_2, y_2, z_2)$; satellite 102(c) is located at $(x_3, y_3, z_3)$; satellite 102(d) is located at $(x_4, y_4, z_4)$; and vehicle 210 is located at a position $(U_x, U_y, U_z)$.

The Cartesian (x,y,z) coordinates of each satellite 102 are determined by GPS receiver 406 using a satellite's ephemeris data. The pseudoranges ($PSR_1$, $PSR_2$, $PSR_3$ and $PSR_4$) between vehicle 210 and each satellite are determined by GPS receiver 406 using transmission time delays. Given this information for at least four satellites, the location of vehicle 210 (i.e., receiver 406) may be determined using the following four distance equations:

$$(x_1-U_x)^2+(y_1-U_y)^2+(z_1-U_z)^2=(PSR_1-B_{clock})^1 \quad \text{EQ. 1}$$

$$(x_2-U_x)^2+(y_2-U_y)^2+(z_2-U_z)^2=(PSR_2-B_{clock})^2 \quad \text{EQ. 2}$$

$$(x_3-U_x)^2+(y_3-U_y)^2+(z_3-U_z)^2=(PSR_3-B_{clock})^2 \quad \text{EQ. 3}$$

$$(x_4-U_x)^2+(y_4-U_y)^2+(z_4-U_z)^2=(PSR_4-B_{clock})^2 \quad \text{EQ. 4}$$

where $B_{clock}$ = clock bias

The "clock bias" is a zero order correction factor which attempts to compensate for the clock error discussed above.

Note that there are four unknowns in these equations: $U_x$, $U_y$, $U_z$, and $B_{clock}$. Note also that each satellite produces an equation. Thus, we have four satellites and four unknowns, allowing the equations to be solved for the clock bias ($B_{clock}$) and the position ($U_x$, $U_y$, $U_z$) of vehicle 210.

If the clock bias ($B_{clock}$) is eliminated, then only three variables remain in the equation such that only three satellites are necessary to solve for the position of vehicle 210. The clock bias can be eliminated if a high precision clock (e.g., an atomic clock) is used in receiver system 400.

If the latitude (L) and longitude (X) of the vehicle are desired, they can be computed using the following equations:

$$\text{Latitude} \approx \cos^{-1}\sqrt{\frac{U_x^2+U_y^2}{U_x^2+U_y^2+U_z^2}} \quad \text{EQ. 5}$$

$$\text{Longitude} = \tan^{-1}\frac{U_y}{U_x} \quad \text{EQ. 6}$$

Note that this latitude equation provides an approximate latitude. Determination of a more exact latitude requires that a complex iterative process be used.

GPS PROCESSING SYSTEM 312 AND KALMAN FILTERING

From a user's perspective, GPS processing system 312 is the most important part of the autonomous vehicle system 200. GPS processing system 312 is responsible for receiving the signals from each GPS satellite, for selecting the optimal satellites for processing, for determining the precise position of each selected satellite, for determining the pseudorange to each satellite, and ultimately for estimating the position of the receiver based on the satellite positions and the pseudoranges. All of this must be done using received data (of greatly attenuated amplitudes) which is most often heavily corrupted with noise (including noise produced by the atmosphere, the preamplifier and the receiver). GPS processing system 312 relies extensively on Kalman Filtering to eliminate the noise from the GPS navigation signals. Kalman filtering is performed in GPS processor 408.

The Kalman filter is a recursive least-squares algorithm which is normally implemented via software or firmware on a digital computer (processor 408). In the preferred embodiment, the Kalman filter assumes that the noisy signals are discrete rather than continuous in nature. Both the data and noise are modeled in vector form, and the data is processed recursively.

A Kalman filter performs two functions. First, it extrapolates a data estimate from previous data. Second, it updates and refines the extrapolated data estimate based on current dam. For example, if a vehicle position $P_1$ and velocity $v_1$ are known at time $t_1$, then the filter (performing the extrapolation step) will use $P_1$ and $v_1$ to estimate a position $P_2$ at a time $t_2$. Thereafter (performing the update step), newly acquired data at time $t_2$ is used to refine the position estimate $P_2$. Data which is fed to the Kalman filter to aid in either the extrapolation or the update/refinement steps is said to "constrain" the filter.

Kalman filtering is well known in the art. For a more detailed discussion on Kalman filtering, see Brown, R. G., "Kalman Filtering: A Guided Tour," Iowa State University; and Kao, Min H. and Eller, Donald H., "Multiconfiguration Kalman Filter Design for High-Performance GPS Navigation," IEEE Transactions on Automatic Control, Vol. AC-28, No. 3, March 1983, the relevant teachings of which are incorporated by reference.

Conventionally, because the Kalman filter is a linear filter, the distance equations set forth above are not solved directly, but are first linearized. That is, the equations are differentiated and the derivative of each equation is solved in order to compute a change from a last known position. For example, a first position estimate at time $t_i$ can be rapidly computed by GPS processor 410 by differentiating the navigation equations and solving for a change in position $(\Delta U_x, \Delta U_y, \Delta U_z)$ from a last known vehicle position $(U_x, U_y, U_z)_{i-1}$ at $t_{s-1}$. This greatly simplifies the solution of the distance equations.

As an alternative to Kalman filtering, least squares estimation or best fit polynomial matching may be used.

BASE STATION 220

GPS dam from constellation 202 of GPS satellites 102 is also received by base station 220. Base station 220 comprises a host processing system 328. Host processing system 328 is similar to GPS processing system 312 of vehicle 210 in that it contains a GPS receiver (e.g., a Magnavox model MX4818) for determining the position of the base station with respect to the center the Earth. The base station is used to make a "differential GPS system".

In a differential GPS system, a GPS computed position of the base station is used in conjunction with the known position of the base station to compute biases. By producing a bias or correction factor for each pseudorange, the base station can quantify and correct errors present in the first position estimate.

The base station can compute biases in a variety of ways. In the preferred embodiment, the GPS computed pseudorange from each satellite is compared to a computed distance ($d$) between the satellite and the known position of base station 220. The difference is a "differential bias" caused by atmospheric and other errors as discussed above. The base station computes a bias for each satellite used in the position computations. These biases, when communicated to the vehicle over communication channel 225, can be used to improve the accuracy of first position estimate.

The distance ($d$) between a satellite at a position (x,y,z) and a base station at a position ($B_x, B_y, B_z$) is computed using the standard distance equation:

$$(x-B_x)^2 + (y-B_y)^2 + (z-B_z)^2 = d^2 \qquad \text{EQ. 7}$$

The position (x,y,z) of the satellite is computed from the satellite's ephemeris data.

The differential GPS system assumes that vehicle 210 is located relatively close to base station 220, e.g., within 40 km, such that the atmospheric errors present at base station 220 are approximately the same as the atmospheric errors present at vehicle 210. This allows the vehicle to correct, i.e., improve the accuracy of, the vehicle's first position estimate based on information generated at the base station.

MOTION POSITIONING SYSTEM (MPS) 314

As discussed above, MPS 314 includes a vehicle odometer 316 and an inertial reference unit (IRU) 318 which track the position of the vehicle based on changes from an initial known position. The vehicle odometer 316 produces data on the distance travelled by vehicle 210. The IRU 318 comprises laser gyroscope(s) 320 and accelerometer(s) 322 which can be used to produce position, velocity, roll, pitch and yaw data. MPS 314 provides the IRU data and the odometer data to VPS processing system 324. An MPS inter-communications processor 326 controls the format of the MPS data which is provided to VPS processing system 324. From this data, VPS processing systems 324 produces a second position estimate for vehicle 210.

VPS PROCESSING SYSTEM 324

Figure 6:
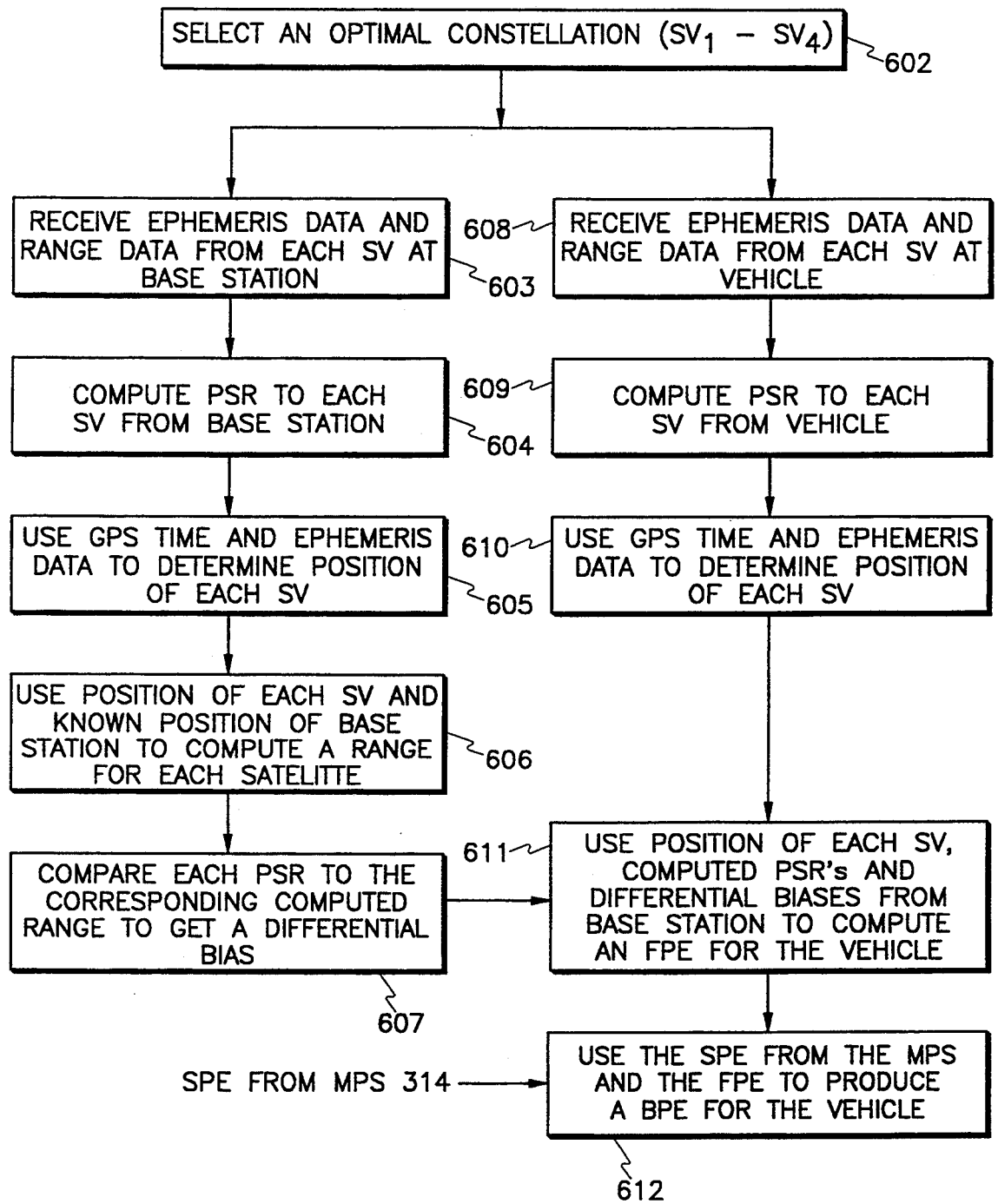
FIG. 6 is a flow chart illustrating the steps of computing a best position estimate for a vehicle.

As mentioned above, the first position estimate (FPE) from GPS may be used as an independent indication of the position of vehicle 210. Similarly, the second position estimate (SPE) computed from MPS data may be used as an independent indication of the position of vehicle 210. In the preferred embodiment, however, the first and second position estimates are combined by VPS processing system 324 to produce a more accurate third or best position estimate (BPE). To accomplish this, VPS processing system relies on Kalman filtering and on weighted averaging to optimally combine the data from GPS processing system 312 with the data from MPS 3 14. This method for producing a BPE is illustrated in a flow chart 600 of FIG. 6.

At a step 602, an optimal constellation of satellites (designated "SV" for "space vehicle") $SV_1$–$SV_4$ is selected. While at least four satellites are required, a greater number may be used to improve the accuracy of the first position estimate. Steps 603–607 are concerned with producing a differential bias for each satellite as discussed above. Steps 608–612 are concerned with using GPS data and the differential biases to compute an accurate first position estimate (FPE) and for combining the FPE with a second position estimate (SPE) from MPS 314 to produce a third or best position estimate (BPE).

Computation of a differential bias at the base station proceeds as follows. At step 603, the ephemeris data and range data are received from each satellite. The pseudorange (PSR) to each satellite is determined at step 604. Then, at step 605, the position of each satellite is computed using the ephemeris data and the GPS time. At steps 606, a range between each satellite and the base station is computed as discussed above using the known position of the base and the ephemeris indicated position of each satellite. At step 607, the computed pseudorange for each satellite is compared to the computed range between the base station and the corresponding satellite. This comparison yields a "differential bias" for each satellite. The differential biases are transmitted to the vehicle for use in computing an accurate first position estimate.

Computation of a best position estimate at the vehicle proceeds as follows. At step 608, the ephemeris data and range data are received from each satellite. The pseudoranges (PSR's) to each satellite are determined at step 609. Then, at step 610, the position of each satellite is computed using the ephemeris data and the GPS time. At step 611, an FPE is computed for vehicle 210 using the pseudoranges from step 609, the satellite positions from step 610, and the differential biases from the base station (step 607). Finally, at step 612, the second position estimate from MPS 314 and the first position estimate from step 611 are combined to produce a third or best position estimate (BPE) for vehicle 210.

In the preferred embodiment, the FPE and the SPE are combined using a weighted combiner. Because the FPE is inherently more accurate, it is normally given more weight then the SPE. However, since both the FPE and the SPE are independently derived, either can be given full weight if the other becomes corrupted. The weighting factors are assigned based on the estimated respective accuracies.

Note that steps 603–607 are performed at base station 220, while steps 608-612 are performed simultaneously at vehicle 210. If desired, the raw GPS data (pseudoranges and satellite positions) may be transmitted from base station 220 to vehicle 210. All computations may then be carried out at vehicle 210.

While this method leads to a best position estimate, its accuracy is dependent on the integrity of the GPS data from GPS satellites 102. As discussed above, the GPS data may be purposely corrupted by the government using selective availability, or a satellite malfunction may produce erroneous GPS data. A differential system will substantially reduce the effects of these errors. However, it may not completely eliminate the errors. Further, a differential system is not always available.

The present invention provides a system and method for accurately determining the position of a satellite. Generally, this is accomplished by predicting an average orbital path for each satellite based on past data. Once an orbital path is predicted, the position of a satellite may be quickly determined. This is illustrated in FIG. 7.

Figure 7:
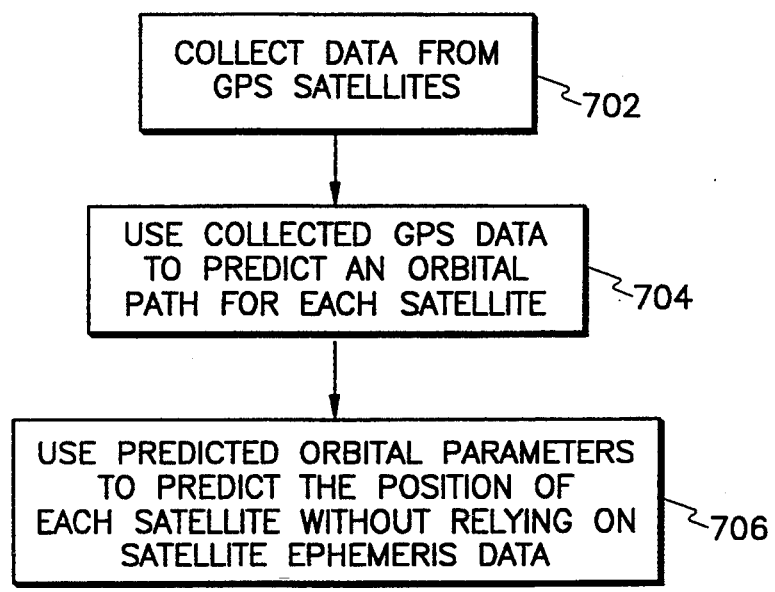
FIG. 7 is a flow chart illustrating the method of the invention.

FIG. 7 shows a flow chart 700 illustrating the steps of the present invention. At step 702, navigation signals are received from the constellation of GPS satellites. This data is then used at step 704 to predict an orbital path for each satellite in the constellation. Once the orbital parameters for the satellite have been predicted, the position of each satellite can be determined as a function of GPS time, without relying on satellite ephemeris data. This is illustrated at step 706.

In a first embodiment, the position of a satellite is determined with indirect reliance on the ephemeris data from the constellation of satellites. In a second embodiment, the position of a satellite is determined without reliance on any satellite provided ephemeris data.

Figure 8:
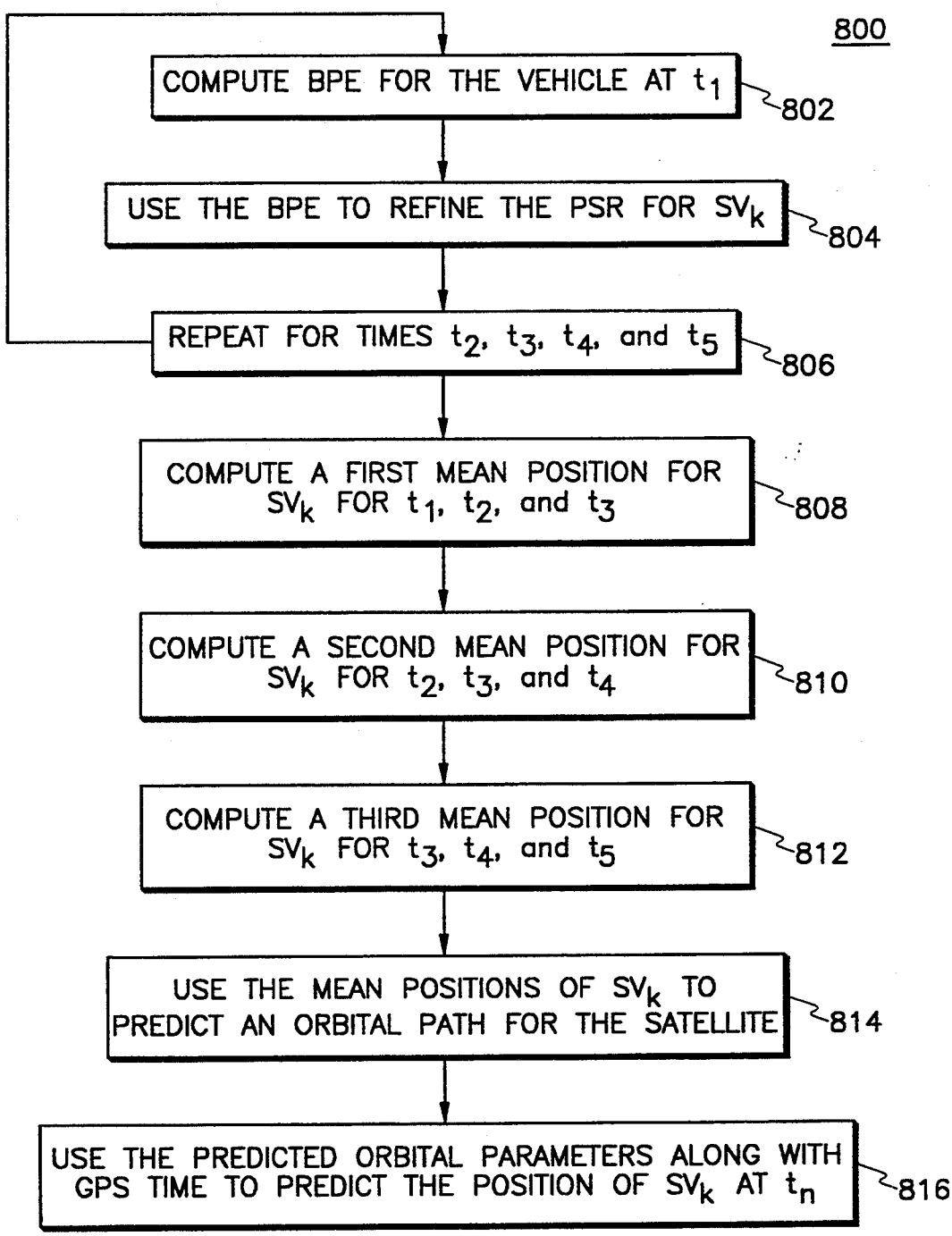
FIG. 8 is a flow chart illustrating the steps of a first embodiment of the invention for predicting the orbital parameters of a satellite.

In the first embodiment of the invention, the orbital path of each satellite is predicted using a method 800 illustrated in FIG. 8. At step 802, a BPE is computed for the vehicle at a time $t_1$, where t is GPS time. At step 804, the BPE for the vehicle is used to refine the pseudorange to the selected satellite ($SV_k$). That is, since the vehicle position $(U_x, U_y, U_z)_1$ and the satellite position $(x,y,z)_{k,1}$ are accurately known at time $t_1$, an accurate pseudorange ($PSR_{k,1}$) may be determined from the following equation:

$$(x_1 - U_{x,1})^2 + (y_1 - U_{y,1})^2 + (z_1 - U_{z,1})^2 = (PSR_{k,1})^2$$

Steps 802 and 804 are repeated, at step 806, for times $t_2$, $t_3$, $t_4$, and $t_5$. The vehicle may be in motion during this period, or it may be stationary.

At step 808, a first mean or average position $P_1 = (\bar{x}_k, \bar{y}_k, \bar{z}_k)_1$ for satellite $SV_k$ is computed using the data from times $t_1$, $t_2$, and $t_3$ and the following equation:

$$(\bar{x}_k - U_{x,t})^2 + (\bar{y}_k - U_{y,t})^2 + (\bar{z}_k - U_{z,t})^2 = (PSR_{k,t})^2 \text{ for}$$
$$t = t_1, t_2, t_3$$

This will yield three equations, which can be used to solve for the three unknowns $(\bar{x}_k, \bar{y}_k, \bar{z}_k)_1$ which make up the mean position of the satellite $SV_k$:

$$(\bar{x}_k - U_{x,1})^2 + (\bar{y}_k - U_{y,1})^2 + (\bar{z}_k - U_{z,1})^2 = (PSR_{k,1})^2$$

$$(\bar{x}_k - U_{x,2})^2 + (\bar{y}_k - U_{y,2})^2 + (\bar{z}_k - U_{t,2})^2 = (PSR_{k,2})^2$$

$$(\bar{x}_k - U_{z,3})^2 + (\bar{y}_k - U_{y,3})^2 + (\bar{z}_k - U_{z,3})^2 = (PSR_{k,3})^2$$

At step 810, a second mean or average position $P_2 = (\bar{x}_k, \bar{y}_k, \bar{z}_k)_2$ for satellite $SV_k$ is computed using the times $t_2$, $t_3$, and $t_4$. At step 812, a third mean or average position $P_3 = (\bar{x}_k, \bar{y}_k, \bar{z}_k)_3$ or satellite $SV_k$ is computed using the times $t_3$, $t_4$, and $t_5$. The three average satellite positions $P_1$, $P_2$, and $P_3$ are then used to predict an orbital path of the satellite $SV_k$ at step 814. For example, the orbital parameters (ephemeris data) for satellite $SV_k$ may be predicted using a best fit curve method (i.e., a best fit elliptical orbit is found which includes the three data points).

Three data points are the minimum which are necessary to determine the orbit of a satellite using a best fit curve method. Additional points may be used to improve the accuracy of the prediction. Further, alternate ways of predicting the orbital parameters of the satellite from the data points may be used. For example, Kalman filtering may be used to predict the orbit of the satellite from a plurality of data points. Additional ways of predicting the orbital parameters will be apparent to those skilled in the art.

Once the orbit of a satellite can be predicted, the position of the satellite at a next time $t_n$ can be computed using GPS time. This is illustrated at step 816. The computed GPS position can be used as the true satellite position.

Steps 802-814 of flow chart 800 illustrate the initialization of the invention. Five time points ($t_1$-$t_5$) are used to predict the orbital parameters of a satellite. Once the orbit of the satellite has been predicted, the integrity of the ephemeris data from that satellite can be checked at each subsequent data point, if desired. Further, if the ephemeris data is monitored, it can be used to continuously refine the orbital parameters for a satellite. This is illustrated in flow chart 900 of FIG. 9.

At step 902, ephemeris data and pseudorange data are received from an SV at a time $t_n$. At step 904, the GPS time and ephemeris data are used to compute a position of the SV. At step 906, the GPS time and the predicted orbital parameters are used to predict the position of the SV at $t_n$.

At step 908, the computed position of the SV from step 904 is compared to the predicted position of the SV from step 906. If the predicted position of the satellite is approximately equal to the GPS computed position, then the GPS data is assumed to be VALID or GOOD and the GPS ephemeris data is used to compute the BPE for the vehicle at step 910. Thereafter, if desired, the new position data may be used to refine the predicted orbital parameters for the satellite at steps 914-918.

At step 914, the BPE is used to refine the pseudorange for the satellite. At step 916, a mean position for the satellite is computed using data from times $t_{n-2}$, $t_{n-1}$ and $t_n$. At step 918, the mean position of the satellite is used to refine the predicted orbital parameters for the satellite. The more data which is compiled for a satellite in this manner, the greater is the accuracy of the orbit prediction.

If, at step 908, the GPS computed satellite position is not approximately equal to the predicted position of the satellite, then the GPS data is probably INVALID or BAD, and the predicted ephemeris data is used to compute the next vehicle position at step 920.

The above discussion has focused on the method of the invention as it applies to a single GPS satellite. This method, however, is repeated for additional satellites as desired. For example, if a constellation of five satellites is used for the navigation of an autonomous vehicle, then the method may be used to monitor the integrity of the GPS data from all five satellites in the constellation.

The embodiments of the invention heretofore described smooth out errors in satellite position as indicated by satellite ephemeris data. That is, ephemeris data is downloaded from a satellite. GPS time is then used to determine the position of the satellite. A drawback to this approach is that precise GPS time is required to compute an accurate satellite position.

In addition, these embodiments of the invention rely on vehicle best position estimates to compute the orbit of a satellite. Best position estimates rely on ephemeris data from the constellation of GPS satellites. Thus, the embodiments are based on the assumption that the initial satellite tracking of steps 802-806 occurred in the absence of corruption by selective availability or, alternatively, that the character of the initial corruption was known.

Figure 10:
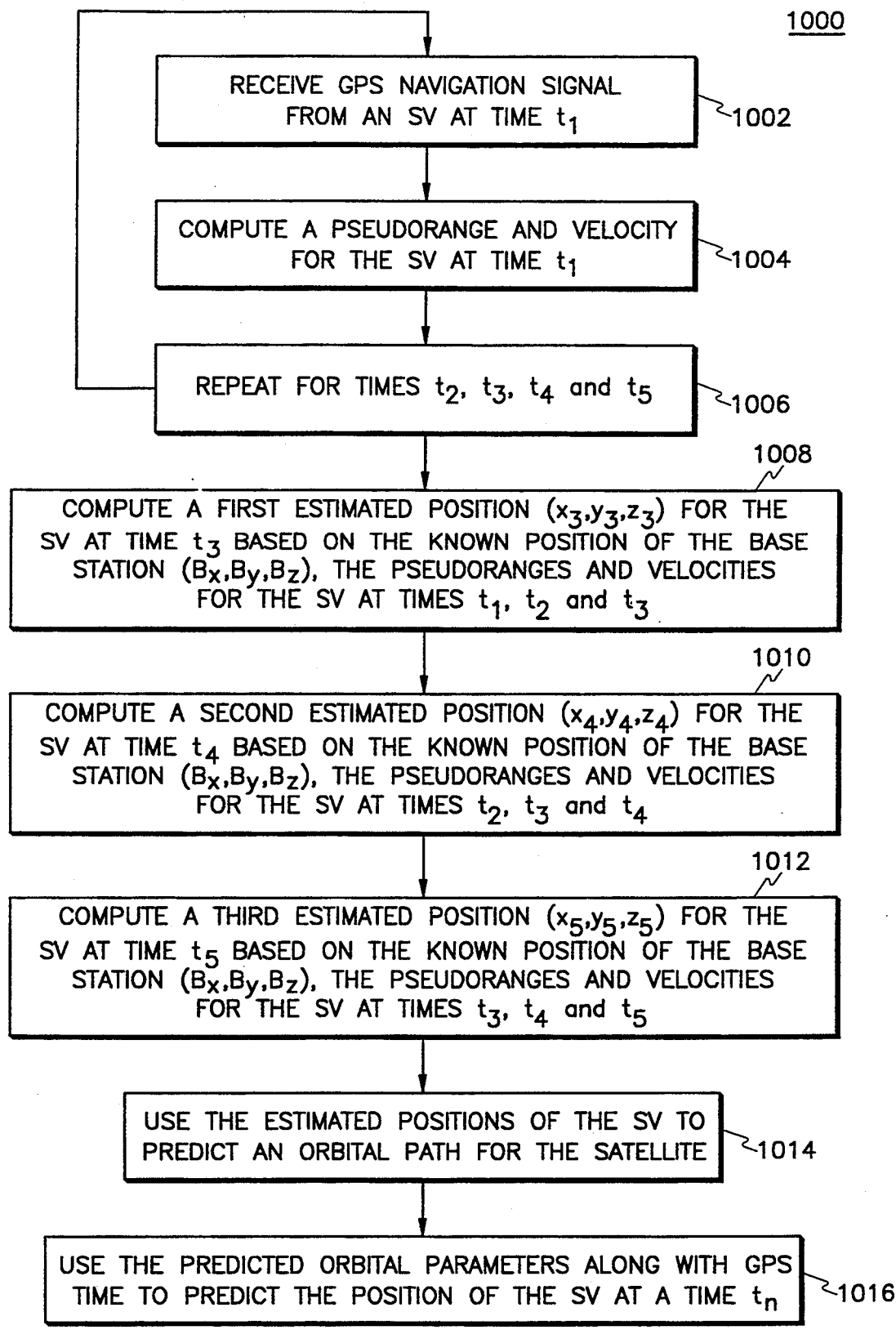
FIG. 10 is a flow chart illustrating the steps of a second embodiment of the invention for predicting the orbital parameters of a satellite.

In the second embodiment of the invention, the average orbital path for a satellite is predicted without using the ephemeris data from the satellite. Rather, "local ephemeris data" is generated for the satellite. This embodiment is illustrated in a flow chart 1000 shown in FIG. 10.

In a step 1002, a GPS navigation signal is received from a satellite (SV) at a time $t_1$. A pseudorange (PSR) to the satellite and a satellite velocity is determined at step 1004. The satellite velocity can be determined by any number of known methods. For example, the velocity may be computed from phase shifts in the carrier wave of the navigation signal (using accumulated delta range (ADR) techniques).

At step 1006, steps 1002 and 1004 are repeated for times $t_2$, $t_3$, $t_4$, $t_5$. The velocity (v) and pseudorange (PSR) for the satellite at times $t_1$, $t_2$ and $t_3$ are then used in conjunction with the known position of the base station ($B_x$, $B_y$, $B_z$) at step 1008 to compute a first estimated position $(x,y,z)_3$ of the satellite at time $t_3$ using the following equations:

$$(x-B_x)^2+(y-B_y)^2+(z-B_z)^2=(PSR_3)^2 \quad \text{EQ. 11}$$

$$(x-B_x-v_{x2}\cdot\Delta t_{2,3})^2+(y-B_y-v_{y2}\cdot\Delta t_{2,3})^2+(z-B_z-V_{z2}\cdot\Delta t_{2,3})^2=(PSR_2)^2 \quad \text{EQ. 12}$$

$$(x-B_x-v_{x2}\cdot\Delta t_{2,3}-v_{x1}\cdot\Delta t_{1,2})^2+(y-B_y-v_{y2}\cdot\Delta t_{2,3}-v_{y1}\cdot\Delta t_{1,2})^2+(z-B_z-V_{z2}\cdot\Delta t_{2,3}-vz1\cdot\Delta t_{1,2})^2=(PSR_1)^2 \quad \text{EQ. 13}$$

where:

$v_{x2}$, $v_{y2}$, $v_{z2}$ = the x, y, and z components, respectively, of velocity for the satellite at time $t_2$.

$v_{x1}$, $v_{y1}$, $v_{z1}$ = the s, y, and z components, respectively, of velocity for the satellite at time $t_1$.

$\Delta t_{2,3} = t_3 - t_2$ $\Delta t_{1,2} = t_2 - t_1$

At step 1010, a second estimated position $(x,y,z)_4$ of the satellite is computed at time $t_4$ using the pseudorange and velocity data for times $t_2$, $t_3$ and $t_4$. At step 1012, a third estimated position $(x,y,z)_5$ of the satellite is computed at time $t_5$ using the pseudorange and velocity data for times $t_3$, $t_4$ and $t_5$. Steps 1010 and 1012 are performed identically to step 1008. The estimated satellite positions for times $t_3$, $t_4$, and $t_5$ are then used to predict an orbital path for the satellite at step 1014.

Once the orbital path of the satellite has been predicted, the data may be used in place of the satellite ephemeris data to accurately determine the position of the satellite. This is illustrated at step 1016 where the predicted orbital parameters are used to predict the position of the satellite at a next time $t_n$. Because this method computes a satellite position without relying on satellite ephemeris data, vehicle position estimates may be made free from the negative effects of selective availability.

Figure 9:
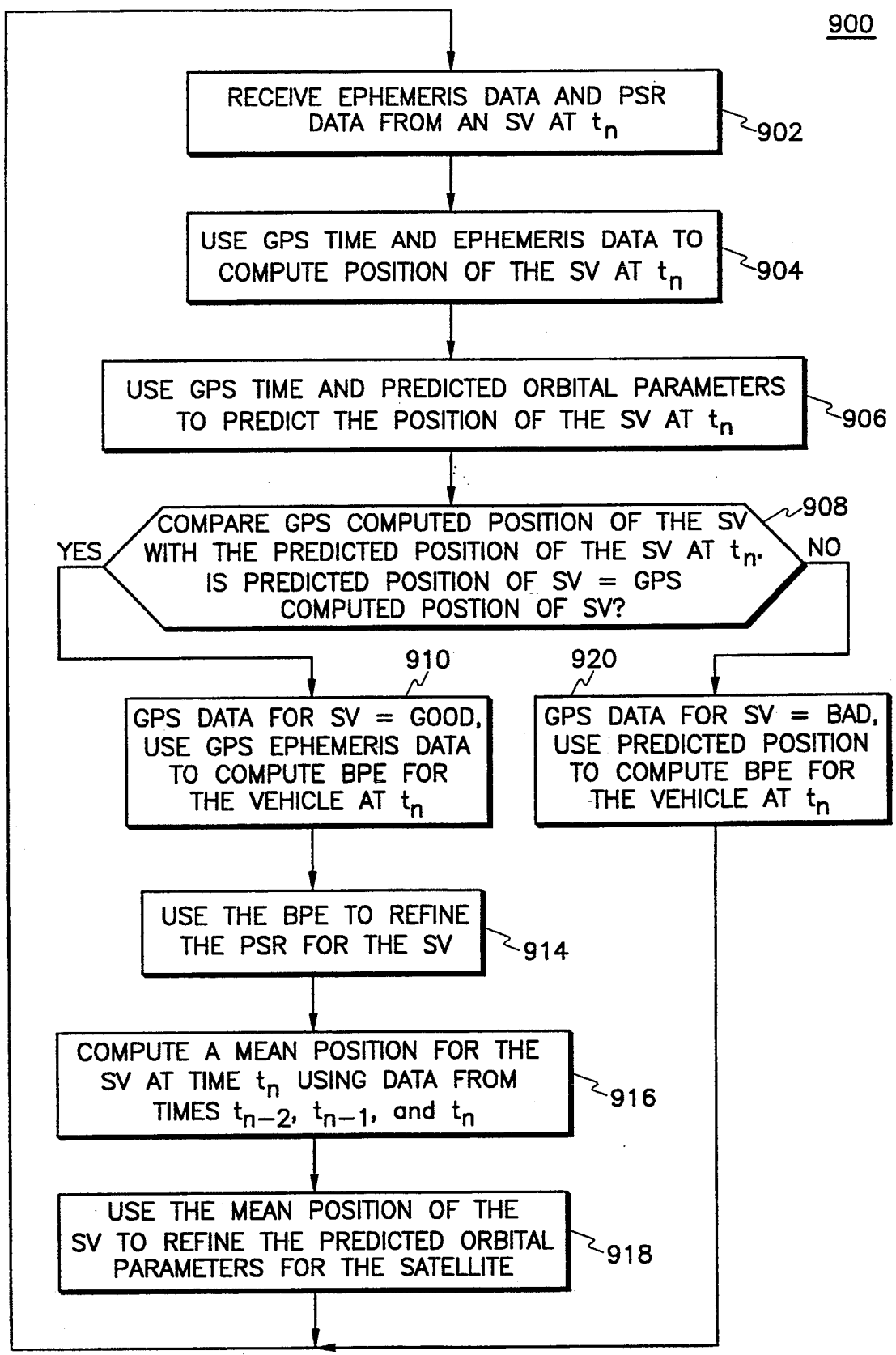
FIG. 9 is a flow chart illustrating the steps of the invention for monitoring the integrity of GPS ephemeris data and for refining the predicted orbital parameters for a satellite.

Steps 1002-1014 may be repeated to continuously refine the predicted orbital path of a satellite as illustrated in flow chart 900 of FIG. 9.

The method of the invention relies on the following assumptions: (1) each satellite is deployed in a fixed orbit; and (2) all biases, e.g., clock and atmospheric, can be initially corrected. Atmospheric biases are corrected using a differential GPS system. If a differential system is not used, then the initial position of vehicle 210 must be accurately known. Moreover, in the case of such an open-ended system, the vehicle cannot be run for long periods of time. That is, periodic initialization is required.

Note that clock biases have been omitted from the equations set forth above to simplify discussion. If present (i.e., a precise clock is not used), then clock biases may be included in the equations of the embodiments set forth above. The result will be that an additional equation will be required to solve for the clock bias.

Note also that the predicted orbital parameters derived using the invention are valid at most for one pass of the satellite across the sky. The next time the satellite comes into view, all parameters must be recomputed.

As discussed above, the computed position of a satellite can also be used to check the integrity of the satellite ephemeris data. That is, ephemeris data from the satellite can be compared to the predicted data for consistency. If the predicted position is approximately equal to the ephemeris indicated position, then the GPS data for $SV_k$ is assumed to be VALID or GOOD. If, however, the ephemeris indicated position is not approximately equal to the predicted position of satellite $SV_k$, then the GPS data is probably INVALID or BAD. By "approximately equal to", it is meant equal to within a predetermined tolerance range.

Heretofore, preferred embodiments of the invention have been described. Persons skilled in the art, however, will recognize a variety of additional ways of practicing the invention. For example, with reference to steps 702 and 704 of FIG. 7, a variety of methods may be used to accurately determine the position of a satellite. These include using four base stations (or vehicles having known positions) to precisely triangulate on the position of a satellite using data from a single time without relying on the ephemeris data broadcast by the satellite. It is possible that orbital parameters computed in this fashion could be accurately used for as long as several days.

Note that the embodiments of the invention discussed above deal primarily with monitoring the integrity of the ephemeris data or replacing the ephemeris data with predicted orbital parameters. However, the pseudorange data, i.e., the encoded transmission time of a signal, transmitted by a satellite may also be corrupt. Bad pseudorange data will be monitored and corrected or eliminated when a best position estimate is computed using the differential system (see flow chart 600). The integrity check of the pseudorange data can be done by the base station in step 609 or by the vehicle in step 610 (see FIG. 6) where Kalman filtering will reject out of range data (i.e., a sudden step in position). Thus, the present invention provides a means for monitoring the integrity of both ephemeris data and pseudorange data broadcast by a GPS satellite.

While the invention has been particularly shown and described with reference to a preferred embodiment thereof, it will be understood by those skilled in the art that various changes in form and detail may be made therein without departing from the spirit and scope of the invention as defined in the appended claims.

I claim:

1. A method for determining the position of a satellite in a satellite based navigation system using a receiver having a known position, the method comprising the steps of:

(a) receiving, from the satellite, a plurality of navigation signals at the receiver;

(b) determining a plurality of mean satellite positions from said navigation signals;

(c) computing orbital parameters for the satellite from said plurality of mean satellite positions; and (d) predicting the position of the satellite at a time $t_n$ from said orbital parameters.

2. The method of claim 1, wherein each of said plurality of navigation signals is received at the receiver at a different time.

3. The method of claim 2, wherein said step of computing comprises performing a best fit curve approximation.

4. A method for determining the position of a vehicle using navigation signals from a satellite based navigation system and a plurality of receivers having known positions, the method comprising the steps of:
   (a) receiving, at each receiver, a navigation signal from a selected satellite;
   (b) computing a pseudorange from said navigation signal at each receiver;
   (c) triangulating to determine the position of said selected satellite using said pseudoranges and the known position of each receiver; and
   (d) repeating steps (a)–(c) to determine a plurality of positions of said selected satellite;
   (e) computing orbital parameters for said selected satellite from said plurality of positions;
   (f) predicting the position of the satellite at a time $t_n$ from said orbital parameters; and
   (g) using said predicted position of said selected satellite to compute the position of the vehicle without relying on ephemeris data provided by said selected satellite.

5. The method of claim 4, wherein said step of computing orbital parameters comprises performing a best fit curve approximation.

6. A method for determining the position of a satellite in a satellite based navigation system using a receiver having a known position, the method comprising the steps of:
   (a) receiving, from the satellite, a first navigation signal at the receiver at a time $t_1$;
   (b) computing, from said first navigation signal, a first pseudorange and a first velocity for the satellite;
   (c) receiving, from the satellite, a second navigation signal at the receiver at a time $t_2$;
   (d) computing, from said second navigation signal, a second pseudorange and a second velocity for the satellite;
   (e) receiving, from the satellite, a third navigation signal at the receiver at a time $t_3$;
   (f) computing, from said third navigation signal, a third pseudorange and a third velocity for the satellite;
   (g) computing orbital parameters for the satellite from said pseudoranges and velocities; and
   (h) predicting, from said orbital parameters, the position of the satellite at a time $t_n$.

7. The method of claim 6, further comprising the step of:
   (i) determining an ephemeris indicated position of the satellite from ephemeris data contained in a navigation signal received at time $t_n$; and
   (ii) comparing said predicted position of the satellite at time $t_n$ with said ephemeris indicated position.

8. A method for determining the position of a satellite in a constellation of such satellites of a satellite based navigation system, the method comprising the steps of:
   (a) determining a first receiver position at a time $t_1$ using the constellation of satellites;
   (b) determining a second receiver position at a time $t_2$ using the constellation of satellites;
   (c) determining a third receiver position at a time $t_3$ using the constellation of satellites;
   (d) determining a fourth receiver position at a time $t_4$ using the constellation of satellites;
   (e) determining a fifth receiver position at a time $t_5$ using the constellation of satellites;
   (f) selecting one of said satellites from said constellation;
   (g) computing a first mean satellite position for said selected satellite using data from times $t_1$, $t_2$, and $t_3$;
   (h) computing a second mean satellite position for said selected satellite using data from times $t_2$, $t_3$, and $t_4$;
   (i) computing a third mean satellite position for said selected satellite using data from times $t_3$, $t_4$, and $t_5$;
   (j) computing a set of orbital parameters for said selected satellite using said first, second, and third mean satellite positions; and
   (k) predicting the position of said selected satellite at a time $t_n$ using said orbital parameters.

9. The method of claim 8, further comprising the step of:
   (1) comparing said predicted position of said selected satellite at time $t_n$ with a position indicated by ephemeris data of said selected satellite at time $t_n$ to monitor the integrity of satellite ephemeris data.

10. The method of claim 8, wherein each said step of determining a receiver position comprises the steps of:
    (1) receiving a first navigation signal from a first satellite;
    (2) computing a first pseudorange and a first satellite position based on said first navigation signal;
    (3) receiving a second navigation signal from a second satellite;
    (4) computing a second pseudorange and a second satellite position based on said second navigation signal;
    (5) receiving a third navigation signal from a third satellite;
    (6) computing a third pseudorange and a third satellite position based on said third navigation signal;
    (7) computing an estimated receiver position based on said pseudoranges and said satellite positions using a triangulation technique;
    (8) refining said estimated receiver position based on bias data from a base station to produce a first refined receiver position; and
    (9) refining said first refined receiver position using data from an inertial navigation system associated with the receiver to produce a second refined receiver position.

11. The method of claim 10, wherein each said step of computing a mean satellite position comprises the steps of:
    (1) computing a refined pseudorange for said selected satellite at a first time using said second refined receiver position and a position of said selected satellite indicated by ephemeris data;
    (2) repeating step (1) of computing for a second time;
    (3) repeating step (1) of computing for a third time; and
    (4) computing a mean satellite position for said selected satellite for said first, second and third times from said refined pseudoranges and said second refined receiver positions.

12. An apparatus for use with a vehicle for determining the position of the vehicle relative to the center of the Earth using navigation signals from a Global Positioning System (GPS) which includes a plurality of satellites orbiting the Earth, the apparatus comprising:
   first means, having a known position, for receiving the navigation signals from the plurality of satellites and for computing a first pseudorange and a velocity for each satellite at a plurality of discrete time intervals;

second means for receiving said first pseudoranges and velocities for said plurality of discrete time intervals for each satellite and for computing orbital parameters for each satellite therefrom, without relying on ephemeris data contained in said navigation signals; and third means for computing a position of the vehicle based on said orbital parameters.

13. The apparatus of claim 12, wherein said first means comprises a first GPS receiver and a first GPS processor located at a base station.

14. The apparatus of claim 13, wherein said second means comprises a second GPS processor mounted on a vehicle.

15. The apparatus of claim 14, wherein said third means comprises a second GPS receiver coupled to said second GPS processor, said second GPS receiver for receiving the navigation signals from the plurality of satellites, computing a second pseudorange for each satellite, and providing said second pseudoranges to said second GPS processor, said second GPS processor for receiving said second pseudoranges and said orbital parameters and computing an estimated position of the vehicle therefrom.

16. A satellite based navigation system for determining the position of a vehicle relative to the center of the Earth using navigation signals transmitted by a plurality of Earth orbiting satellites, the system comprising:

base station means, having a known position, for receiving the navigation signals from the plurality of satellites, for computing a pseudorange and a velocity for each satellite at a plurality of discrete time intervals, and for computing orbital parameters for each satellite from said pseudoranges and velocities for said plurality of discrete time intervals, without relying on ephemeris data contained in the navigation signals;

data transmitter means, coupled to said base station means, for transmitting said orbital parameters to the vehicle;

data receiver means, coupled to the vehicle, for receiving said orbital parameters from said data transmitter means; and GPS receiver means, coupled to said data receiver means, for receiving the navigation signals from the plurality of satellites, for computing a pseudorange to each satellite, and for computing the position of the vehicle based on said orbital parameters and said pseudorange for each satellite.

17. An apparatus for use with a vehicle for determining the position of the vehicle relative to the center of the Earth using navigation signals from a Global Positioning System (GPS) which includes a plurality of satellites orbiting the Earth, the apparatus comprising:

first means, mounted on the vehicle, for receiving the navigation signals from the plurality of satellites and for computing the position of said first means based on ephemeris data and pseudoranges computed from the navigation signals; and second means for monitoring the integrity of said ephemeris data for each satellite and for determining if any of the ephemeris data is corrupt, said second means including means for determining, for each satellite, a plurality of mean satellite positions from the navigation signals, means for computing orbital parameters for each satellite from said plurality of mean satellite positions, means for predicting a position of each satellite from said orbital parameters, and means for comparing, for each satellite an ephemeris indicated satellite position to said predicted position.

18. The apparatus of claim 17, further comprising:

third means for using said predicted position of a satellite to compensate for any corrupt ephemeris data when computing the position of said first means.

19. The apparatus of claim 18, wherein said first means comprises a GPS receiver and a GPS processor.

* * * * *